(12) United States Patent
Wessels et al.

(10) Patent No.: US 7,350,457 B2
(45) Date of Patent: Apr. 1, 2008

(54) APPARATUS FOR PREPARING A FOAMED BEVERAGE SUITABLE FOR CONSUMPTION

(75) Inventors: Hendrikus Christinus M. Wessels, Uithoorn (NL); Emil Herman Rusche, Nieuwegein (NL)

(73) Assignee: Sara Lee/DE N.V. (NL)

( * ) Notice: Subject to any disclaimer, the term of this patent is extended or adjusted under 35 U.S.C. 154(b) by 0 days.

(21) Appl. No.: 10/480,267

(22) PCT Filed: Jun. 10, 2002

(86) PCT No.: PCT/NL02/00378

§ 371 (c)(1),
(2), (4) Date: Jul. 30, 2004

(87) PCT Pub. No.: WO02/100224

PCT Pub. Date: Dec. 19, 2002

(65) Prior Publication Data

US 2004/0247757 A1 Dec. 9, 2004

(30) Foreign Application Priority Data

Jun. 8, 2001 (NL) .................................... 1018248

(51) Int. Cl.
*A23F 5/00* (2006.01)
(52) U.S. Cl. ..................................... 99/323.1; 99/323.3
(58) Field of Classification Search ................ 426/477, 426/590, 591, 593, 594, 597, 598, 580, 584; 99/323.1, 323.3
See application file for complete search history.

(56) References Cited

U.S. PATENT DOCUMENTS 3,212,757 A    10/1965 Martin et al.
3,648,904 A    3/1972 Teige
3,750,908 A    8/1973 Bauerlein et al.
4,518,105 A    5/1985 Kuckens et al.

(Continued)

FOREIGN PATENT DOCUMENTS

DE          3838235          11/1988

(Continued)

OTHER PUBLICATIONS

International Search Report.

*Primary Examiner*—Anthony Weier
(74) *Attorney, Agent, or Firm*—Altera Law Group, LLP

(57) ABSTRACT

The apparatus for preparing a beverage with a foam layer suitable for consumption is provided with a mixing chamber, supply means for supplying a liquid, such as water or steam, to the mixing chamber and first dosing means for dosed supply of a concentrate to be mixed with the liquid, such as a coffee concentrate, to the mixing chamber for mixing the concentrate with the liquid in the mixing chamber while foam is formed for obtaining the foamed beverage suitable for consumption. The mixing chamber is designed as a whirl chamber while the supply means supply the liquid to the whirl chamber in such a manner that in the whirl chamber a whirl is formed of the supplied fluid. The supply means are provided with a second dosing device for dosed supply of the liquid to the whirl chamber and the apparatus is further provided with a control device for controlling the first and second dosing device for preparing a predetermined amount of beverage.

31 Claims, 2 Drawing Sheets

U.S. PATENT DOCUMENTS

Figure 1:
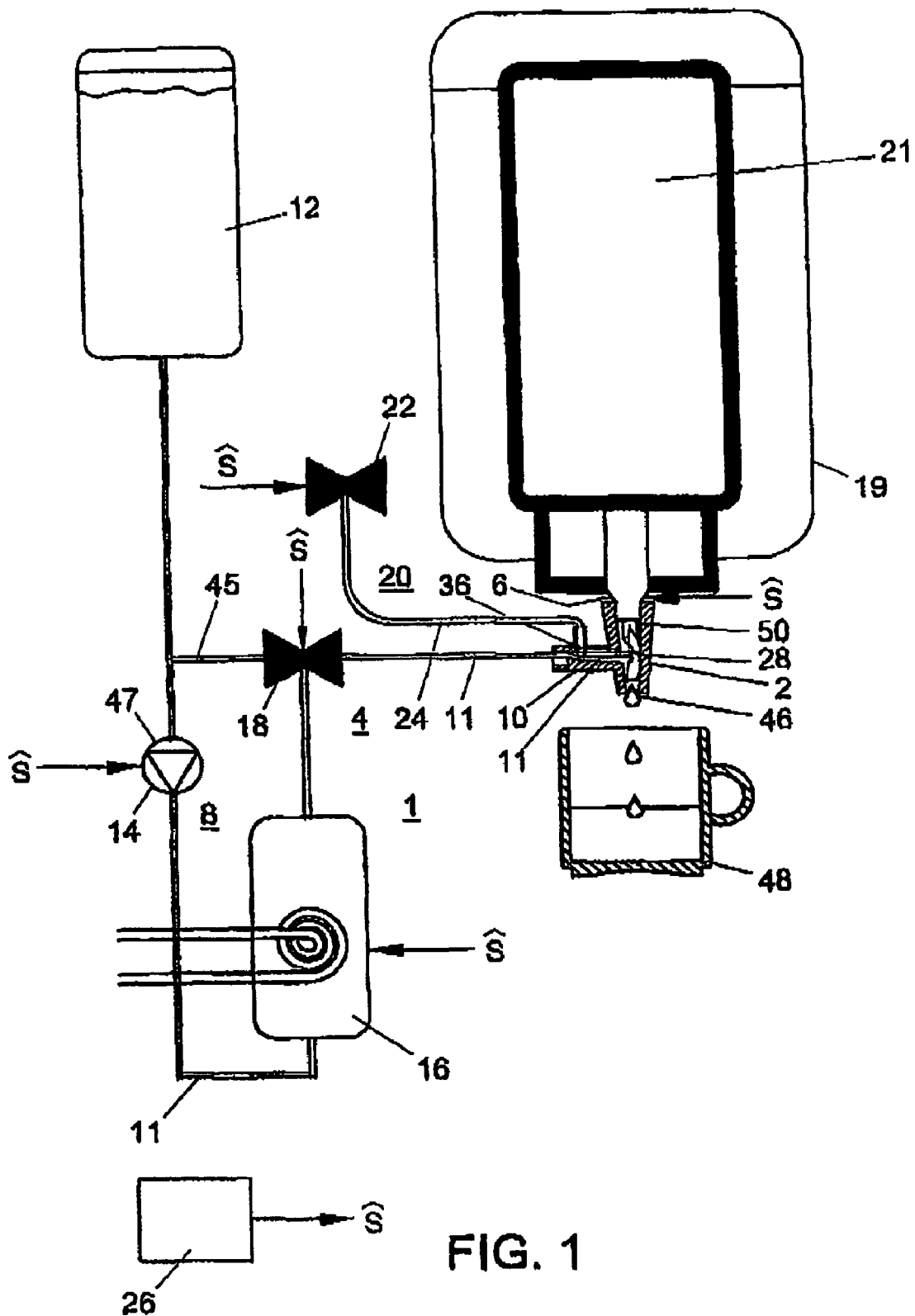

| | | |
|---|---|---|
| 4,873,916 A | 10/1989 | Piscaer |
| 5,685,639 A | 11/1997 | Green |
| 6,019,032 A | 2/2000 | Arksey |
| 6,183,800 B1 * | 2/2001 | van Straten et al. ........ 426/569 |
| 6,499,389 B1 | 12/2002 | Probst |

FOREIGN PATENT DOCUMENTS

| | | |
|---|---|---|
| EP | 0 280 345 | 8/1988 |
| EP | 0 885 580 | 10/1997 |
| EP | 0 886 249 | 12/1998 |
| JP | 2000-157231 | 6/2000 |
| NL | 1012395 | 6/1999 |
| WO | 00/16674 | 9/1999 |
| WO | 00/79223 | 6/2000 |
| WO | 00/79224 | 6/2000 |
| WO | 01/21292 | 9/2000 |

* cited by examiner

APPARATUS FOR PREPARING A FOAMED BEVERAGE SUITABLE FOR CONSUMPTION

The invention relates to an apparatus for preparing from a concentrate such as a coffee concentrate, cocoa concentrate, tea concentrate or milk concentrate, a beverage with a foam layer suitable for consumption, such as café créme, cocoa créme, tea with foam or foamed milk, provided with a mixing chamber, liquid supply means comprising a liquid flow path for supplying a liquid such as water to the mixing chamber under pressure, and first dosing means for dosed supply of the concentrate to be mixed with the liquid to the mixing chamber for mixing the liquid with the concentrate in the mixing chamber, the apparatus further providing air supply means for supplying air to the mixing chamber for obtaining the beverage with the foam layer.

The invention also relates to a method for preparing from a concentrate such as a coffee concentrate, cocoa concentrate, tea concentrate or milk concentrate, a beverage with a foam layer, suitable for consumption, such as café créme, cocoa créme, tea with foam or foamed milk, wherein a liquid such as water is mixed with a dosed amount of concentrate such as a coffee concentrate, cocoa concentrate, tea concentrate or milk concentrate such that when mixing, air is beaten into the mixture for obtaining the beverage with the foam layer.

Such an apparatus and method is known from the international patent application WO 01 21292 A1.

In the known apparatus and method, the liquid flows through a pipe with a right-angled bend. Here, the bend functions as a mixing chamber. Upstream of the bend, the concentrate is pumped into the pipe with the aid of a pump. The concentrate and the liquid flow from this point to the bend, in which they are mixed. Additionally, the mixing chamber formed in the bend is provided with means for supplying air to the mixing chamber. The air is then drawn into the mixing chamber by the mixture of liquid and concentrate flowing through the mixing chamber. Through this supply of air, foam is formed in the beverage. When this beverage is collected in a holder, an amount of beverage is formed on which a foam layer is present.

A disadvantage of the known apparatus and method is that the concentration of the beverage to be prepared is not always accurately determined and can vary in time, i.e. per consumption. Further, it appears that a foam layer is obtained which is not optimal and also varies in time, i.e. per consumption. A further disadvantage is that the mixing chamber, after it has been used, can become soiled with residues of the mixture. Further, residues of the concentrate can remain behind in the tubular path in which the concentrate travels from the pump to the pipe with the bend at right angles.

The invention has for its object to provide an apparatus and method with which at least a part of the disadvantages mentioned and preferably all disadvantages mentioned can be obviated.

To this end, the apparatus according to the invention is characterized in that the mixing chamber is designed as a whirl chamber wherein the liquid supply means supply the liquid to the whirl chamber such that in the whirl chamber a whirl arises of the supplied liquid and the concentrate, while the liquid supply means are provided with a second dosing device for dosed supply of the liquid to the whirl chamber and a nozzle included in the liquid flow path for generating a jet of the liquid which, in use, is spouted into the whirl chamber, the apparatus being further provided with a control device for controlling the first and second dosing device for preparing a predetermined amount of the beverage with the foam layer.

As the mixing chamber is designed as a whirl chamber, a fine, stable foam layer is obtained. Further, the quality of the foam layer and its properties are accurately determined and will not, or hardly vary in time, i.e. per consumption. As a whirl chamber is utilized, it can be ensured that the properties of the beverage, such as its concentration and the quality of the foam layer, can be accurately predetermined.

As both the amount of liquid and the amount of concentrate can be supplied to the whirl chamber in a dosed manner, the properties of the suitable beverage, such as the concentration and the character of the foam layer can be accurately predetermined.

Further, in this manner, a predetermined amount of beverage can be generated in an accurate manner.

Preferably, it holds that the air supply means comprise an air inlet which is included outside the whirl chamber downstream of the nozzle in the liquid flow path so that the air in the liquid flow path is drawn in by the liquid jet in the liquid flow path. It appears that in this manner also the air is drawn in in a well-dosed manner. Experiments have shown that supplying air to the liquid outside of the whirl chamber improvers the quality and homogeneity of the beverage even more.

In particular, it further holds that the nozzle is situated at a distance from the whirl chamber. As the nozzle is located at a distance from the whirl chamber, the liquid jet can generate a proper reduced pressure in the liquid flow path for drawing in air. Also, if so desired, when a certain type of nozzle is selected, the jet can slightly fan out at a position where the jet enters the whirl chamber.

Further, it preferably holds that the size of a flow-through surface of the liquid flow path increases downstream of the nozzle. As a result, the chance is reduced that the jet is at least partly broken by a wall of the liquid flow path.

In particular it holds that the liquid flow path downstream of the nozzle slopes downwards. As a result, it is achieved that possible residual liquid flows from the liquid flow path to the whirl chamber after the preparation of the beverage.

Preferably, it further holds that the control device for preparing the beverage activates the first and second dosing device for supplying the concentrate and the liquid to the whirl chamber whereupon the control device deactivates the first dosing device sooner than the second dosing device, for rinsing the whirl chamber with the liquid. In this manner it is achieved that no concentrate and/or a mixture of liquid and concentrate remain(s) behind in the whirl chamber. Accordingly, the apparatus provides a high degree of hygiene and, moreover, requires little maintenance. For instance, it is not necessary to clean the whirl chamber regularly as is the case with known apparatuses in which whirl chambers and/or mixing chambers are used.

In particular it holds that the air supply means are provided with an aeration valve via which, with the aeration valve in opened position, air can be drawn in.

Preferably, it further holds that the control device closes the aeration valve after the first dosing device has been deactivated and before the second dosing device is deactivated. As a result, at rinsing, air bubbles are prevented from being supplied to the liquid. As, thus, liquid without air is supplied to the whirl chamber, the whirl chamber is optimally rinsed.

Preferably, it holds that the second dosing device is provided with means such as a pump for supplying the liquid at a pressure to the whirl chamber. When the liquid is supplied to the whirl chamber at a sufficiently high pressure, strong whirls are created, further promoting the formation of foam. Here, for instance, a pressure of 0.5-5 atmosphere is conceivable. However, other values are also possible.

In particular, it holds that the apparatus is designed such that in use, the liquid is supplied to the whirl chamber in a direction deviating from the vertical.

Preferably, it then holds that in use, the liquid is supplied to the whirl chamber in an at least virtually horizontally directed direction. This also improves the whirls for obtaining a fine-bubble foam layer. It appears that the apparatus can be improved even further when the whirl chamber tapers in downward direction, at least partly. The whirl chamber can then be provided at its upper side with a supply opening for supplying the concentrate to the whirl chamber. This has as an advantage that the concentrate itself can be supplied to the whirl chamber in a dosed manner but not necessarily under pressure. The fact is that after the first dosing device has dispensed the concentrate, the concentrate can flow freely to the whirl chamber under the influence of gravity. Preferably, it therefore holds that the first dosing device is located above the whirl chamber.

Further, a side wall of the whirl chamber is preferably provided with an opening for supplying the liquid to the whirl chamber. Preferably, it holds that the whirl chamber tapers in downward direction from a position which is located higher than a position in which the liquid is supplied to the whirl chamber. Preferably, the whirl chamber is provided at its underside with an outflow opening.

For the proper functioning of the whirl chamber, preferably, a side wall of the tapering part includes an angle of 5-30° with the vertical. A very good result is obtained when the angle included with the vertical is equal to 12-18°. However, preferably it holds that the included angle is approximately equal to 15° to guarantee a proper mixing and whirl in the mixing chamber. Further, the outflow opening preferably has a smallest diameter of 2-7 mm and particularly of 3-5 mm. In this manner it is achieved that the whirl chamber gradually drains.

Preferably, the apparatus is further provided with a heating unit for heating the liquid which is supplied to the whirl chamber. In this manner hot beverages suitable for consumption, such as café créme, cocoa créme, tea with foam or foamed milk can be obtained. For café cré, the liquid generally consists of a coffee concentrate, for cocoa créme the liquid consists of a cocoa concentrate and for tea with foam the liquid consists of tea concentrate. For foamed milk, the liquid can consist of a milk concentrate. Generally, the liquid will consist of water. However, other liquids are also possible.

However, other combinations are also conceivable. Cold fruit drinks such as orange juice which can be prepared from an orange concentrate and cold water can then be considered. It is also possible to prepare a non-foamed beverage such as a café latte, by closing the aeration valve. Then, preferably, the first dosing device is connected to the whirl chamber in an air tight manner. Also, first, coffee (with or without foam layer) can be prepared whereupon, milk (with or without foam) is prepared which milk is added to the coffee.

The method according to the invention is characterized in that mixing is carried out such that a whirl arises of the liquid and the concentrate, while the liquid is also supplied in a dosed manner for preparing a predetermined amount of beverage with the foam layer.

EP 0 885 580 discloses an apparatus for preparing a beverage suitable for consumption with the aid of a whirl chamber. However, here, no foamed beverage is involved because the apparatus is not provided with an air inlet for supplying air to the whirl chamber. The apparatus is provided with a nozzle for generating a jet of the liquid. The nozzle is situated in an upstanding side wall of the whirl chamber and not at a distance from the whirl chamber as is preferably the case according to the invention.

WO 00/16674 also discloses an apparatus for preparing a foamed beverage suitable for consumption. However, the apparatus is not designed for mixing a concentrate with a liquid.

De 3 838 235 also discloses an apparatus for preparing a beverage with foam suitable for consumption. This apparatus too is not designed for mixing a concentrate with a liquid.

Figure 2A:
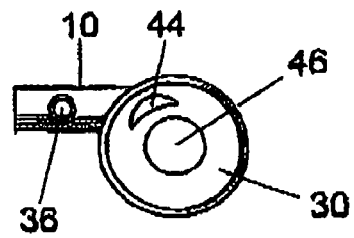
Figure 2B:
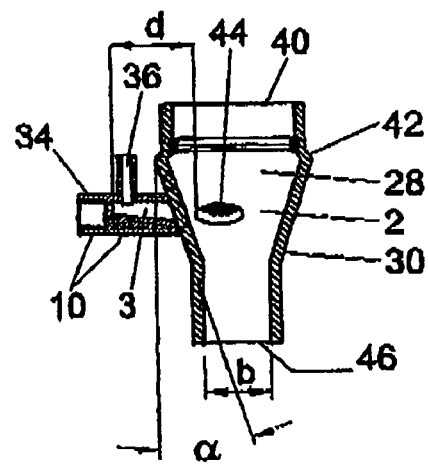
Figure 4A:
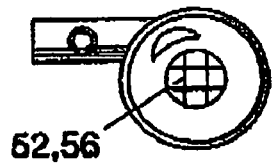
Figure 3A:
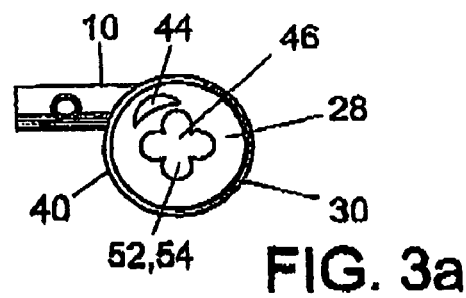
Figure 4B:
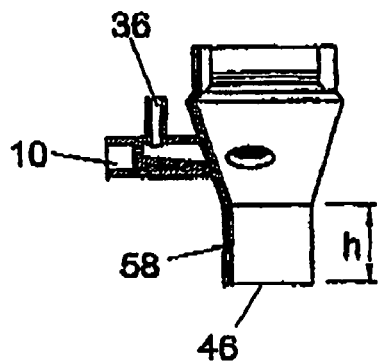
Figure 3B:
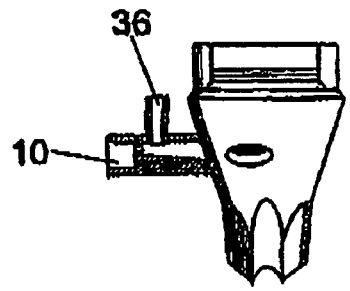

Presently, the invention will be further elucidated with reference to the drawing:

In the drawing:

FIG. 1 schematically shows a possible embodiment of an apparatus according to the invention for carrying out a method of the invention;

FIG. 2*a* shows a top plan view of a first embodiment of a whirl chamber with a part of the liquid supply means of the apparatus according to FIG. 1;

FIG. 2*b* shows a side view of the whirl chamber with a part of the liquid supply means according to FIG. 2*a*;

FIG. 3*a* shows a top plan view of a second embodiment of a whirl chamber with a part of the liquid supply means of the apparatus according to FIG. 1;

FIG. 3*b* shows a side view of the whirl chamber with a part of the liquid supply means according to FIG. 3*a*;

FIG. 4*a* shows a third embodiment of a whirl chamber with a part of the liquid supply means of the apparatus according to FIG. 1; and FIG. 4*b* shows a side view of the whirl chamber with a part of the liquid supply means according to FIG. 4*a*.

In FIG. 1, with reference numeral 1, an apparatus for preparing a beverage with a foam layer suitable for consumption is indicated. A beverage with a foam layer is herein understood to mean, inter alia, a café créme, a cocoa créme, tea with foam, foamed milk, a fruit juice with a foam layer etc. For instance, the café créme, cocoa créme, tea with foam or foamed milk can be prepared hot and the fruit juice can be prepared cold. The apparatus is provided with a whirl chamber 2 and supply means 4 for supplying a liquid such as water to the whirl chamber 2. However, other fluids are also conceivable. The apparatus is further provided with a first dosing device 6 for supplying in a dosed manner a concentrate to be mixed with the liquid such as a coffee concentrate, cocoa concentrate, tea concentrate, milk concentrate or fruit juice concentrate. In this example, the concentrate consists of a coffee-milk concentrate i.e. a concentrate of coffee and milk which is suitable for preparing a café créme with milk. In use, in the whirl chamber 2, the liquid is mixed with the concentrate.

In this example, the liquid supply means 4 are provided with a second dosing device 8 for supplying liquid in a dosed manner, via a supply duct 10 of the supply means to the whirl chamber. In this example, the second dosing device 8 is provided with a liquid reservoir 12 which, in use, is filled with the liquid, in this example water. Further, the second dosing device 8 comprises a pump 14 and a heater 16. The pump is arranged for pumping water under pressure from the liquid reservoir 12 to the heater 16. In the heater 16 the liquid is heated. The second dosing device is further provided with a two-position valve 18 (three-way valve) wherein, in a first position, the liquid is pumped from the heater to the supply duct 10 and hence to the whirl chamber 2, while in a second position of the two-position valve 18 the liquid is pumped back to the heater 12 and/or the entrance of the pump 14.

The apparatus is further provided with a holder 19 in which a storage package 21 with concentrate, in this example the coffee and milk concentrate, can be received. The storage package 21 forms a reservoir which is filled with concentrate. The first dosing device 6 is in fluid communication with the storage package 21. The first dosing device 6 can, for instance, be designed as described in Dutch patent 1012395 or U.S. Pat. No. 4,518,105.

The apparatus is further provided with air supply means 20 for supplying air to the whirl chamber 2. In this example, the air supply means are provided with an aeration valve 22 for supplying air, via a duct 24, to a liquid flow path 11 through which the liquid flows to the whirl chamber under pressure. Hence, this liquid flow path 11 comprises the duct between the pump 14 and the heater 16, the duct between the heater 16 and the two-position valve 18 and the duct 18 which extends as far as the whirl chamber. Via the air supply means 20, 22 therefore, the air can be supplied to the liquid outside the whirl chamber 2.

Further, the apparatus is provided with a control device 26 which generates control signals Ŝ for controlling the first dosing device 6, the second dosing device 8 and the aeration valve 22. In this example, controlling the second dosing device 8 implies that the pump 14, but also, for instance, the two-position valve 18 and the heater 16 are controlled by the controlling device 26.

In FIGS. 2a, 2b, a first possible embodiment of the whirl chamber 2 with a part of the liquid supply means 4 is shown in further detail. The whirl chamber 2 comprises a chamber 28 which tapers in downward direction. Accordingly, in this example, an upstanding inner wall 30 of this chamber forms a conical surface. The supply duct 10 terminates in the whirl chamber 2 in a manner such that the liquid is supplied to the whirl chamber in a direction deviating from the vertical 32. In this example, it holds that the liquid is supplied to the whirl chamber in an at least virtually horizontally directed direction, more specifically in this example in a tangential direction of the chamber. The supply duct 10 forms a part of the liquid flow path 11 for supplying the liquid under pressure to the whirl chamber. In the liquid flow path 11, a nozzle 34 is included for generating a jet of the liquid which, in use, is spouted into the whirl chamber. The air supply means 20 comprise an air inlet 36, included in the liquid flow path 11 outside the whirl chamber 2 downstream of the nozzle 34 such that air is sucked into the liquid flow path by the liquid jet which, in use, is present in the liquid flow path. The nozzle 34 is located at a distance d from the whirl chamber 2. The size of a flow-through surface 38 of the liquid flow path 11 (the duct 10) increases downstream of the nozzle 34. Further, the liquid flow path 11 (the duct 10) slopes downward downstream of the nozzle 34.

At its upper side, the whirl chamber 2 is provided with a supply opening 40 for supplying the concentrate to the whirl chamber. In this example, the first dosing device 6 is located above the whirl chamber 2. In use, the first dosing device supplies a certain amount of concentrate without the supplied concentrate being under pressure. Accordingly, under the influence of gravity, the dispensed amount of concentrate will travel downwards to the whirl chamber 2.

The whirl chamber tapers in downward direction from a position 42 which is located higher than a position 44 from which, in use, the liquid is supplied to the whirl chamber 2. This position 44 is characterized by an opening 44 in the inner wall 30 of the whirl chamber. The whirl chamber is further provided with an outflow opening 46 for discharging the beverage with a foam layer from the whirl chamber 2. In this example, the outflow opening 46 is located at an underside of the whirl chamber. The upstanding inner wall of the tapering part preferably includes an angle α of 5-30° with the vertical. In particular, this angle α is equal to 12-18° In this example, this angle is approximately equal to 15°. In this example, the outflow opening has a smallest diameter b of 2-7 mm and preferably a diameter b of 4-8 mm.

The apparatus described up to this point works as follows.

For preparing a café créme, the control device 26 opens the aeration valve 22. Further, the two-position valve 18 is placed in the first position. Simultaneously or somewhat later, the pump 14 and the first dosing device 6 are started. From that moment on, the dosing device 6 starts dispensing concentrate to the whirl chamber 2. Under the influence of gravity, the concentrate flows to the whirl chamber 2 and, in this example, is not under pressure. Simultaneously, liquid, in this example water, is pumped from the liquid reservoir 12 to the heater 16 where it is heated and where, then, the liquid is supplied under pressure via the two-position valve 18 and the supply duct 10 to the whirl chamber 2. In the supply duct 10, the nozzle 34 generates a liquid jet. Downstream of the nozzle 43, the liquid jet draws in air via the air inlet 36. Together with the liquid jet, this drawn-in air is transported via the part of the liquid flow path 10 located downstream of the nozzle, to the whirl chamber. The liquid jet spouts into the whirl chamber. In the whirl chamber 2, a whirl of the supplied liquid arises. The whirl substantially takes place about the vertical 32. Also, as already stated, via the opened aeration valve 22, air is drawn in by the liquid jet. This air is carried along by the liquid 10 to the whirl chamber 2. Therefore, the air supply means are arranged such that through suction force of the liquid jet, the air is fed to the fluid. By virtue of the fact that the liquid is supplied under pressure, therefore, on the one hand, the whirl mentioned can be formed, and on the other hand, the suction force mentioned can be generated. As, simultaneously, the concentrate is not supplied to the whirl chamber under pressure, it can be very accurately dosed, which is highly beneficial to the quality of the end product i.e. the quality of the beverage suitable for consumption. Through the whirl, the liquid and the concentrate are intermixed well while, at the same time, the air in the mixture is beaten whereby foam formation occurs. Due to the tapering inner surface 30 of the whirl chamber 2, an optimal whirl is formed. The product ready for consumption gradually leaves the whirl chamber via the outflow opening 46, for instance to be collected in a mug 48.

After some time, for instance after 6.5 seconds, the control device 26 deactivates the first dosing device 6. After some more time, for instance 2.5 seconds later, the control device 26 closes the aeration valve 22. The result is that only under pressure, heated liquid is supplied to the whirl chamber. In this liquid, no air bubbles are present because the aeration valve 22 is closed. Thus, in the whirl chamber, whirls of only heated liquid are formed, with the result that the entire whirl chamber, and, in this example, also the outlet 50 of the first dosing device 6 is partly inserted in the whirl chamber via the supply opening 40, is rinsed well. The arrangement is rinsed thus that no concentrate remains behind in the whirl chamber and in the outlet 50 of the first dosing device 6. This hot liquid also flows into the mug. For instance 1 second after the aeration valve 4 is closed, the control device 26 also deactivates the pump 14. Hereupon, the whirl chamber 2 empties into the mug 48 and the beverage in the mug is ready for consumption. On top, this beverage contains an attractive, uniform, fine-bubble froth layer. Here, the downwardly sloping duct 10 empties downstream of the nozzle 34.

At a moment when the pump 40 is deactivated, the control device 26 controls the two-way valve 18 such that this is put in a different position. The result is that the liquid flow to the supply duct 10 is immediately closed off and that the liquid flow which rapidly decreases by switching off the pump is sent back via a duct 45 to the liquid reservoir 12 and/or an inlet 47 of the pump.

From the above, it appears that the control device, for instance for preparing the beverage, activates the first and the second dosing device for supplying the concentrate and the liquid to the whirl chamber and that the control device deactivates the first dosing device sooner than the second dosing device for rinsing and cleaning the whirl chamber with the liquid. Preferably, the control device closes the aeration valve after the first dosing device has been activated and before the second dosing device is deactivated.

The invention is not limited in any manner to the embodiments outlined hereinabove. For instance, the outflow opening 46 can further be provided with a whirl damping means 52 for damping the whirl of the mixture which flows out through the outflow opening 46 to the mug 42. It appears that this is even more beneficial to the foam formation. To this end, in the example of FIGS. 3a and 3b, the outflow opening is provided with a number of recesses 54 extending radially from an outer edge of the outflow opening towards the centre of the outflow opening. Hence, viewed from above (see FIG. 3a), the outflow opening has the shape of a cloverleaf.

According to an alternative embodiment as shown in FIGS. 4a and 4b, the outflow opening is for instance provided with a grid 66 which functions as a whirl damping means, the beverage flowing through the grid when leaving the whirl chamber, which grid dampens the whirls. Instead of the grid 56, it is also possible to lengthen a part 58 of the whirl chamber extending from the outflow opening 46 in upward direction to the tapering part of the whirl chamber. Here, the height h as indicated in FIG. 4b is involved. By increasing the height h, also a whirl damping means is obtained so that, then, the grid 46 can be omitted.

Also, different types of dosing devices 6 and 8 can be used. It is also possible to prepare a non-foamed beverage, such as a café latte, by closing the aeration valve. Preferably, then, the first dosing device is connected to the whirl chamber in an air tight manner. The return duct can also terminate in the top or the bottom of the reservoir 12. Further, the whirl chamber can also be rinsed with the aid of the liquid without a beverage having been prepared immediately prior thereto. To this end, the control unit can separately activate the second dosing device for rinsing the whirl chamber with the liquid. Also, the liquid reservoir can be replaced with a liquid inlet which is directly coupled to a water mains network. For instance, the nozzle 34 can have a smallest circular cross section of 0.7-10 mm. Other values are also possible. A smallest flow-through surface of the nozzle can for instance be 2-3 mm². Other values are also possible. Also, a spout end of the nozzle can have a shape known per se such that the liquid jet generated by the nozzle fans out in downstream direction. As the dimension of the flow-through surface of the liquid flow path downstream of the nozzle also increases, the liquid jet can thereby be prevented from touching an inner wall of the liquid flow path 11. As the nozzle lies at a distance from the whirl chamber, not only can air be drawn in by the liquid jet, but the liquid can also fan out, if desired, depending on the type of nozzle used. Also, the apparatus can be provided with a plurality of concentrate reservoirs 22 which are filled with different concentrates for preparing, at will, different types of beverages. Each of the concentrate reservoirs 22 can, in a manner known per se, at will, supply concentrate to the whirl chamber. It is conceivable, then, that on the basis of coffee concentrate, first, coffee is prepared and that, on the basis of milk concentrate, subsequently, milk is prepared while the coffee and the milk are collected in one and the same mug. Also, it is possible that per concentrate reservoir, a whirl chamber is provided. Such variants are all understood to fall within the framework of the invention.

The invention claimed is:

1. An apparatus for preparing from a concentrate, a foamed beverage suitable for consumption comprising a mixing chamber, a liquid supply comprising a liquid flow path for supplying a liquid under pressure to the mixing chamber, and first dosing device supplying, in a dosed manner, the concentrate to be mixed with the liquid to the mixing chamber for mixing the liquid with the concentrate in the mixing chamber, the apparatus being further provided with air supply supplying air to the mixing chamber for obtaining the beverage having a foam layer, wherein the mixing chamber is configured as a whirl chamber, wherein the liquid supply is configured to supply the liquid to the whirl chamber such that a whirl arises of the supplied liquid and the concentrate, the liquid supply further including a second dosing device for supplying, in a dosed manner, the liquid to the whirl chamber, and a nozzle included in the liquid flow path for generating a jet of the liquid which, in use, is spouted into the whirl chamber, the apparatus being further provided with a control device for controlling the first and second dosing devices for preparing a predetermined amount of the beverage with a foam layer and further including an air inlet which is included outside the whirl chamber downstream of the nozzle in the liquid flow path so that the air in the liquid flow path is drawn in exclusively by the liquid jet into the liquid flow path and independently of the concentrate.

2. An apparatus according to claim 1, characterized in that the nozzle is located at a distance from the whirl chamber.

3. An apparatus according to claim 1, characterized in that the size of a flow-through surface of the liquid flow path downstream of the nozzle increases.

4. An apparatus according to claim 1, characterized in that downstream of the nozzle, the liquid flow path slopes downwards.

5. An apparatus according to claim 1, characterized in that the apparatus is provided with a reservoir which is filled with the concentrate.

6. An apparatus according to claim 1, characterized in that the apparatus is provided with an inlet and/or a reservoir which is filled with the liquid for supply of the liquid to the second dosing device.

7. An apparatus according to claim 1, characterized in that the air supply means are provided with an aeration valve via which, with the aeration valve in an opened position, the air can be drawn in.

8. An apparatus according to claim 1, characterized in that the second dosing device is provided with means such as a pump for supplying the liquid to the whirl chamber under pressure.

9. An apparatus according to claim 1, characterized in that the apparatus is arranged such that, in use, the liquid is supplied to the whirl chamber in a direction deviating from the vertical.

10. An apparatus according to claim 9, characterized in that, in use, the liquid is supplied to the whirl chamber in an at least virtually horizontally directed direction.

11. An apparatus according to claim 1, characterized in that the whirl chamber in downward direction at least partly tapers.

12. An apparatus according to claim 1, characterized in that the whirl chamber is designed, at least substantially, rotation-symmetrically about a vertical axis.

13. An apparatus according to claim 12, characterized in that the whirl chamber is arranged such that with respect to the vertical axis, the liquid is tangentially supplied to the whirl chamber.

14. An apparatus according to claim 1, characterized in that the whirl chamber, at its upper side, is provided with a supply opening for supplying the concentrate to the whirl chamber.

15. An apparatus according to claim 14, characterized in that the first dosing device is located above the whirl chamber.

16. An apparatus according to claim 15, characterized in that the first dosing device dispenses an amount of concentrate while the amount of concentrate is not under pressure and moves towards the whirl chamber under the influence of gravity.

17. An apparatus according to claim 1, characterized in that the whirl chamber tapers in downward direction from a position which is located higher than a position in which the liquid is supplied to the whirl chamber.

18. An apparatus according to claim 1, characterized in that an upstanding inner wall of the whirl chamber is provided with an opening for supplying the liquid to the whirl chamber.

19. An apparatus according to claim 1, characterized in that the whirl chamber is further provided with an outflow opening for discharging the beverage from the whirl chamber.

20. An apparatus according to claim 19, characterized in that the outflow opening is located at an underside of the whirl chamber.

21. An apparatus according to claim 11, characterized in that an upstanding inner wall of the tapering part includes and angle of 5-30 degrees with the vertical.

22. An apparatus according to claim 21, characterized in that the angle included with the vertical is equal to 12-18 degrees.

23. An apparatus according to claim 22, characterized in that the included angle is approximately equal to 15 degrees.

24. An apparatus according to claim 19, characterized in that the outflow opening is provided with a grid through which the beverage flows while leaving the whirl chamber, for damping the whirl in the beverage flowing out of the whirl chamber through the outflow opening.

25. An apparatus according to claim 19, characterized in that the outflow opening has a smallest diameter of 2-10 mm.

26. An apparatus according to claim 1, characterized in that the apparatus is further provided with a heating unit for heating the liquid which is supplied to the whirl chamber.

27. An apparatus according to claim 1, characterized in that the control device for preparing the beverage activates the first and second dosing devices for supplying the concentrate and the liquid to the whirl chamber whereupon the control device deactivates the first dosing device sooner than the second dosing device for rinsing the whirl chamber with the liquid.

28. An apparatus according to claim 7, characterized in that the control device closes the aeration valve after the first dosing device has been deactivated and before the second dosing device is deactivated.

29. An apparatus according to claim 1, characterized in that a smallest flow-through surface of the nozzle is approximately equal to 2-3 square millimeters.

30. An apparatus according to claim 1, characterized in that the control device activates the second dosing device for rinsing the whirl chamber.

31. An apparatus for preparing, a foamed beverage suitable for consumption comprising
 a) a mixing chamber, a liquid supply comprising a liquid flow path for supplying a liquid under pressure to the mixing chamber, and
 b) first dosing device supplying, in a dosed manner, the supply to be mixed with the liquid to the mixing chamber for mixing the liquid with the supply in the mixing chamber, the apparatus being further provided with air source capable of supplying air to the mixing chamber for obtaining the beverage with a foam layer, wherein the mixing chamber is configured as a whirl chamber, wherein the liquid supply is configured to supply the liquid to the whirl chamber such that a whirl arises of the supplied liquid,
 c) a second dosing device for supplying, in a dosed manner, the liquid to the whirl chamber, and a nozzle included in the liquid flow path for generating a jet of the liquid configured to be spouted into the whirl chamber, the apparatus being further provided with a control capable of controlling the first and second dosing devices to thereby prepare a predetermined amount of the beverage with a foam layer and
 d) an air inlet which is included outside the whirl chamber downstream of the nozzle in the liquid flow path so that the air in the liquid flow path is drawn in exclusively by the liquid jet into the liquid flow path and independently of the supply.

* * * * *